(12) United States Patent
Kim et al.

(10) Patent No.: US 7,126,295 B2
(45) Date of Patent: Oct. 24, 2006

(54) STOPPING NOISE REDUCTION CIRCUIT FOR START MOTOR USING RESISTOR

(75) Inventors: Chang-Il Kim, Kyongju-si (KR);
Ji-Gon Kim, Kyongju-si (KR);
Soon-Sik Park, Kyongju-si (KR);
Hyun-Cheul Ahn, Kyongju-si (KR)

(73) Assignee: Valeo Electrical Systems Korea Limited(KR)

( * ) Notice: Subject to any disclaimer, the term of this patent is extended or adjusted under 35 U.S.C. 154(b) by 0 days.

(21) Appl. No.: 11/201,011

(22) Filed: Aug. 10, 2005

(65) Prior Publication Data

US 2006/0038515 A1 Feb. 23, 2006

(30) Foreign Application Priority Data

Aug. 23, 2004 (KR) ...................... 10-2004-0066319

(51) Int. Cl.
*H02P 1/00* (2006.01)
(52) U.S. Cl. ........................ 318/139; 361/152; 335/181
(58) Field of Classification Search ................ 318/139; 335/181; 251/129.08; 361/152, 153; 180/142; 340/603
See application file for complete search history.

(56) References Cited

U.S. PATENT DOCUMENTS 3,739,309 A * 6/1973 Dalton ........................ 335/181
5,915,667 A * 6/1999 Kim et al. ............. 251/129.08

* cited by examiner

*Primary Examiner*—Karen Masih
(74) *Attorney, Agent, or Firm*—R. Neil Sudol; Henry D. Coleman; William J. Sapone

(57) ABSTRACT

A stopping noise reduction circuit for a start motor comprises a battery generating a power supply to drive the start motor, a key switch for controlling an on/off of the power supply, a solenoid having a permanent magnet, P and H coils, and a movement contact to drive the start motor, and further comprises a B1 terminal grounded inside the solenoid, an M1 terminal connected to an M terminal of the start motor, and a resistor coupled with the B1 or M1 terminal. In the stopping noise reduction circuit, upon an off condition of the key switch, the movement contact of the solenoid is connected to the B1 and M1 terminals such that more induced current than an induced current flowing into the P and H coils, in a current induced by a rotator of the start motor, flows to ground via the resistor within a short flow time.

2 Claims, 3 Drawing Sheets

STOPPING NOISE REDUCTION CIRCUIT FOR START MOTOR USING RESISTOR

BACKGROUND OF THE INVENTION

1. Field of the Invention

The present invention relates to a stopping noise reduction circuit for a start motor using a resistor, and more particularly, to a stopping noise reduction circuit for a start motor using a resistor that is capable of maximally reducing a stopping noise by freely adjusting a stopping time of a rotator (rotor) in the start motor by making that the resistor is connected to two terminals separately arranged inside a solenoid such that a current induced by the rotator of the start motor is conducted to ground by way of the resistor after the two terminals are coupled via a movement contact upon an off operation of a key switch.

2. Description of Related Art

A conventional start motor drive circuit is generally provided with a solenoid 1, a direct current start motor 2 for a start-up of an engine, a battery BAT, and a key switch SW. In this configuration, when a power is supplied from the battery BAT to the solenoid 1 by an on operation of the key switch SW, a movement contact 3 of the solenoid 1 is coupled with a B terminal of the battery BAT and an M terminal of the start motor 2 by a magnetic force created by P and H coils winding a permanent magnet inside the solenoid 1. This enables the start motor 2 to be driven simultaneously with the supply of the power.

After that, when the operation of the start motor 2 is stopped by a turning off of the key switch SW, the movement contact 3 of the solenoid 1 is disconnected from the B terminal of the battery BAT and the M terminal of the start motor 2, and then an induced current caused by a induced voltage from the internal rotator rotation of the start motor 2 flows via a closed circuit by the start motor 2, the P and H coils inside the solenoid 1, and ground, thereby stopping the rotator after it rotates for a predetermined time.

As mentioned above, in the prior art circuit, the induced voltage is generated by the inertia rotation of the rotator inside the start motor 2 using a field magnet of the permanent magnet type, and the induced current is created by such induced voltage.

In the prior art circuit, however, the stopping time of the rotator of the start motor 2 is lengthy, that is, the time taken to conduct the induced current to ground is prolonged. Due to this reason, the stopping noise of the rotator, that is, mechanical and electrical noise, which seems to be not revealed or issued since it is involved in mechanical friction noise (such as friction tone of pinion and ring gear) during the start-up operation, is produced as high frequency component for a long time after a completion of the start-up operation. Moreover, the endurance life span of brush and bearing inside the start motor 2 is shortened by the continuous rotation of the rotator, even after the power is switched off.

To increase this endurance life span of the brush and bearing inside the start motor 2, a considerable expense is needed.

Considering the above-mentioned problem, there has been proposed a circuit for stopping noise reduction of a start motor, as disclosed in Korean Patent Application No. 2002-29876. That is, as shown in FIG. 2, a B1 terminal grounded inside a solenoid 1 and an M1 terminal connected to an M terminal of a start motor 2 are provided additionally so that the B1 and M1 terminals are coupled via a movement contact upon an off operation of a key switch SW in order to conduct current induced by a rotation of a rotator inside the start motor 2 to ground as rapidly as possible. This allows a decrease in the stopping noise of the rotator by stopping the rotation of the rotator inside the start motor 2 immediately.

In the conventional stopping noise reduction circuit for the start motor, however, the induced current flows into the body from the M terminal, the M1 terminal, and the B1 terminal at a time maximally rapidly, without using any separate resistor, stopping the rotator (rotor) of the start motor 2 within an excessively short time. For this reason, an abnormal tone occurs by an amplification of the existing stopping noise by a different stopping noise, and a high current flows instantaneously for a short time, which shortens the endurance life span of the brush.

SUMMARY OF THE INVENTION

The invention is intended to solve the disadvantages of the general stopping noise reduction circuit for the start motor and improve the reduction effects of the stopping noise. It is, therefore, a primary object of the present invention to provide a stopping noise reduction circuit for a start motor using a resistor that is capable of maximally reducing a stopping noise by freely adjusting a stopping time of a rotator in the start motor by connecting the resistor to two terminals separately arranged inside a solenoid such that a current induced by the rotator or rotor of the start motor is conducted to ground by way of the resistor after the two terminals are coupled via a movement contact upon a turning off of a key switch.

In accordance with the present invention, there is provided a stopping noise reduction circuit for a start motor comprising a battery for generating a power to drive the start motor, a key switch for controlling an on/off of the power supply from the battery, and a solenoid having a permanent magnet, P and H coils, and a movement contact to drive the start motor, the circuit comprising: a B1 terminal grounded inside the solenoid; an M1 terminal connected to an M terminal of the start motor; and a resistor is coupled with the B1 or M1 terminal, wherein, upon a turning off of the key switch, the movement contact of the solenoid is connected to the B1 and M1 terminals such that more induced current than an induced current flowing into the P and H coils inside the solenoid, in a current induced by a rotator of the start motor, is is conducted to ground via the resistor within a short time.

BRIEF DESCRIPTION OF THE DRAWINGS

The above and other objects and features of the present invention will become apparent from the following description of preferred embodiments taken in conjunction with the accompanying drawings, in which.

DESCRIPTION OF THE PREFERRED EMBODIMENT

Hereinafter, a structure and an operation of a stopping noise reduction circuit for a start motor using a resistor in accordance with the present invention will be explained in detail with reference to the accompanying drawings.

Figure 3:
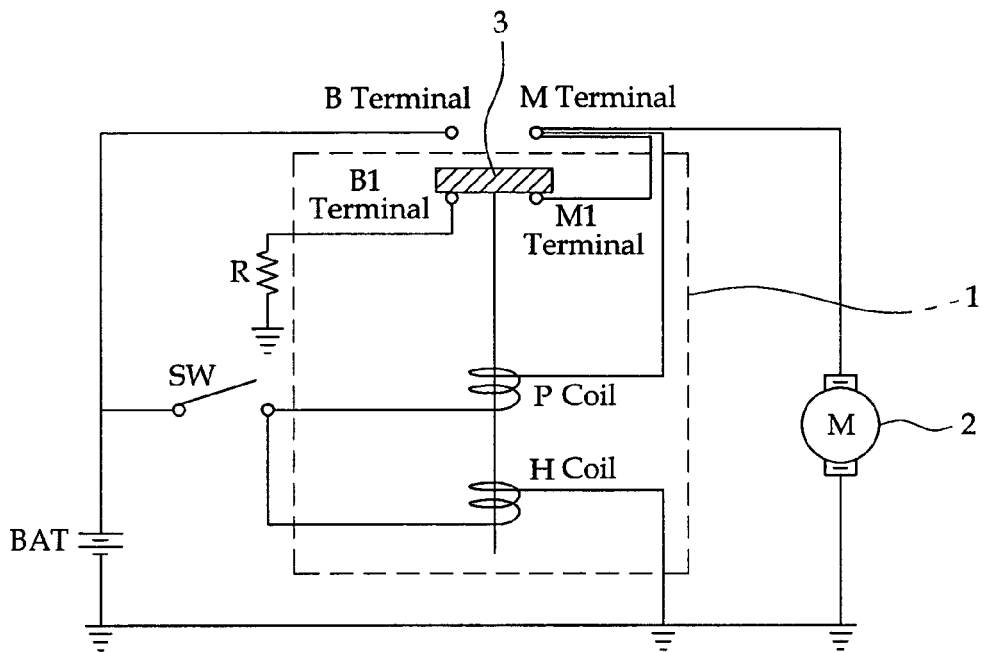
FIG. 3 illustrates a diagram showing a stopping noise reduction circuit for a start motor employing a resistor in accordance with one embodiment of the present invention.

FIG. 3 is a diagram showing a stopping noise reduction circuit for a start motor employing a resistor in accordance with one embodiment of the present invention. As shown, a resistor with a resistance value less than that of a serial circuit of P and H coils in a solenoid 1 is connected to a B1 terminal, out of two terminals B1 and M1 separately provided in the solenoid 1.

Specifically, the stopping noise reduction circuit for the start motor in accordance with one embodiment of the present invention comprises a battery BAT for supplying a power to drive a start motor 2, a key switch SW for controlling an on/off of the power supply from the battery BAT, and a solenoid 1 having a permanent magnet, P and H coils for driving the start motor 2.

In addition to the above configuration, the stopping noise reduction circuit of the invention further comprises a grounded B1 terminal, an M1 terminal coupled with the M terminal of the start motor 2 in the solenoid 1, and a resistor R with a certain resistance value connected to the B1 terminal.

The resistor R may be implemented by a general resistor or coil wound resistor, wherein if the resistor R is the coil wound one, it may be implemented by winding coil around an inner circumference or outer circumference of each of P and H coils inside the solenoid 1.

In the solenoid 1 as structured above, upon a turning on of the key switch SW, a movement contact 3 is connected to the B terminal of the battery BAT and the M terminal of the start motor 2 to drive the start motor 2; and, upon a turning off of the key switch SW, the movement contact 3 is disconnected from the B terminal of the battery BAT and the M terminal of the start motor 2, and simultaneously connected to the B1 and M1 terminals. By this arrangement, the induced current generated by the rotator or rotor of the start motor 2 is conducted to ground by way of the resistor R.

In accordance with the invention, since the value of the resistor R is less than that of a serial circuit of the P and H coils inside the solenoid 1, most of the induced current flows through the resistor R for a short time, rather than through the P and H coils inside the solenoid 1, in view of the configuration of the parallel circuit.

Figure 4:
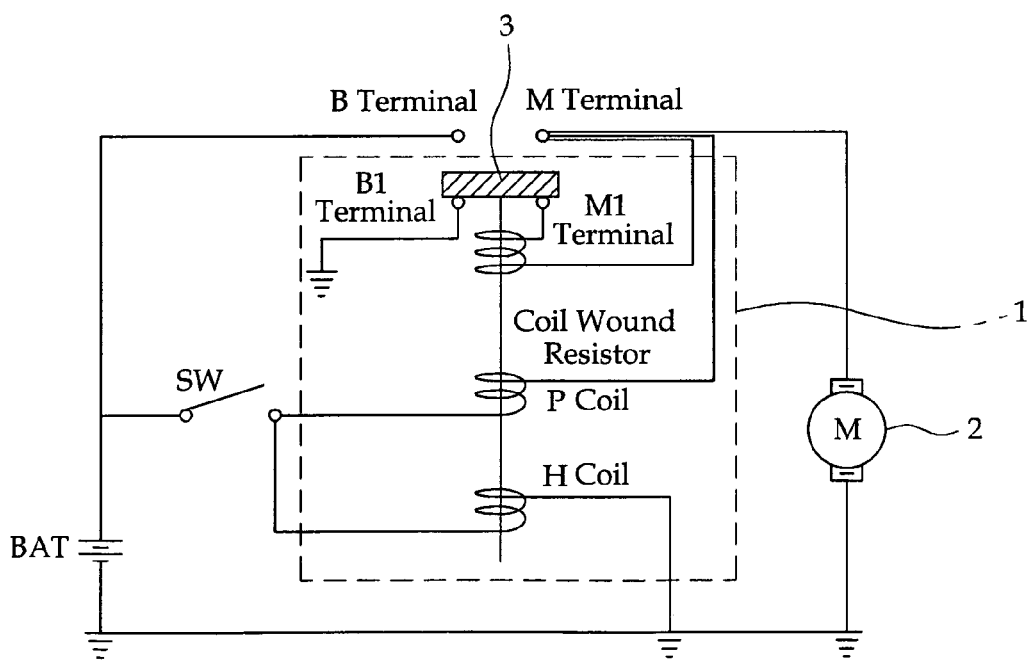
FIG. 4 presents a diagram depicting a stopping noise reduction circuit for a start motor employing a resistor in accordance with another embodiment of the present invention.

FIG. 4 illustrates a diagram depicting a stopping noise reduction circuit for a start motor employing a resistor in accordance with another embodiment of the present invention. As shown, the whole structure of the circuitry in FIG. 4 is the same as that depicted in FIG. 3, in which a resistor R with a certain value is connected to the M1 terminal. The resistor R may also be implemented by a regular resistor or coil wound resistor; and if the resistor R is the coil wound resistor, it may be implemented by winding coil around an inside diameter or an outside diameter of each of P and H coils inside the solenoid 1.

In the solenoid 1 as configured above, upon a turning on of the key switch SW, a movement contact 3 is connected to the B terminal of the battery BAT and the M terminal of the start motor 2 to drive it; and, upon a turning off of the key switch SW, the movement contact 3 is disconnected from the B terminal of the battery BAT and the M terminal of the start motor 2, but simultaneously connected to the B1 and M1 terminals. By this configuration, of the current induced by the rotator or rotor of the start motor 2, more induced current flows through the resistor R within a short time than flows through the P and H coils.

As mentioned above, the present invention employs the principle that an overall consuming electrical energy (W=IVt), according to the induced voltage V made by the inertia rotation of the rotator inside the start motor 2, the induced current I by the induced voltage V, and a time t when the induced current I has been consumed after a completion of the start-up operation, is identical, in view of the law of energy conservation.

Figure 1:
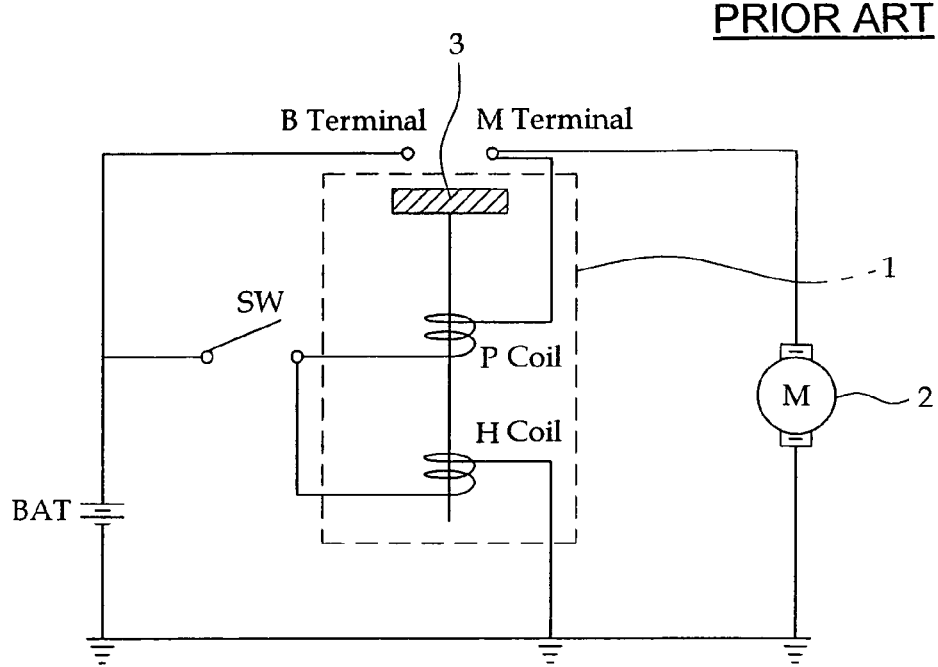
FIG. 1 shows a conventional start motor drive circuit.
Figure 2:
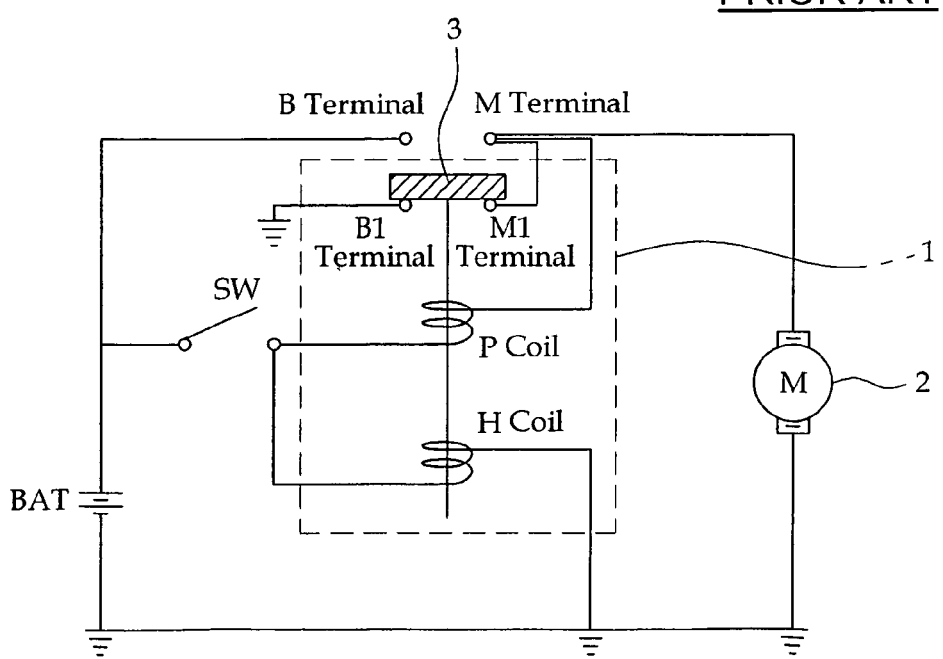
FIG. 2 is a diagram depicting a conventional stopping noise reduction circuit for a start motor.

Thus, the present invention can reduce the stopping noise of the start motor maximally and also prevent the endurance life span of the brush from being shortened, by increasing the flow time of the induced current, that is, the stopping time of the rotator compared to the existing stopping noise reduction circuit for the start motor shown in FIG. 2, but by decreasing it compared to the conventional drive circuit for the start motor shown in FIG. 1, utilizing the simple resistor.

The operation of the stopping noise reduction circuit for the start motor using the resistor in accordance with the invention as configured above will now be explained in detail.

In the stopping noise reduction circuit for the start motor of the invention as structured above, the drive operation of the start motor 2 is the same as the prior art in case that the power from the battery BAT is supplied to the solenoid 1 upon a turning on of the key switch SW.

Specifically, when the power is supplied from the battery BAT to the solenoid 1 by a turning on of the key switch SW, the movement contact 3 of the solenoid 1 is coupled with the B terminal of the battery BAT and the M terminal of the start motor 2 by the magnetic force created by P and H coils winding the permanent magnet within the solenoid 1. This allows the start motor 2 to be driven simultaneously with the supply of the power.

After that, when the operation of the start motor 2 is stopped by a turning off of the key switch SW, the movement contact 3 of the solenoid 1 is disconnected from the B terminal of the battery BAT and the M terminal of the start motor 2, and is simultaneously connected to the B1 and M1 terminals. By this configuration, the current arising from the voltage induced by the internal rotator of the start motor 2 flows into ground by way of the resistor R coupled with the B1 terminal.

In other words, the induced current flows via the closed circuit of the start motor 2, the M1 terminal, the movement contact 3, B1 terminal, resistor R, and a grounded contact within the solenoid 1. Under this configuration, since a resistance or impedance value of the resistor R is less than that of the serial circuit of the P and H coils inside the solenoid 1, more induced current flows through the resistor R than through the P and H coils inside the solenoid 1 within a short time.

Thus, with the stopping noise reduction circuit of the invention, the induced current flows for a much shorter time than that which flows via the closed circuit by the start motor 2, the P and H coils, and the ground inside the solenoid 1 according to the prior art. According to this, the rotator of the start motor 2 is stopped rapidly, and the stopping noise of the rotator is also reduced considerably to the extent that the user cannot recognize, by properly adjusting the flow time of the induced current through the resistor R, that is, the stopping time of the rotator, without its excessive reduction.

As shown in FIG. 4, in case that the resistor R is connected to the M1 terminal, when the drive of the start motor 2 is stopped by a turning off of the key switch SW, the movement contact 3 of the solenoid 1 is disconnected from the B terminal of the battery BAT and the M terminal of the start motor 2, and simultaneously connected to the B1 and M1 terminals. By this, induced current created by the rotation of the internal rotator of the start motor 2 is conducted to ground by way of the resistor R coupled with the M1 terminal.

That is, more induced current than flows through the P and H coils inside the solenoid 1 flows via the closed circuit of the start motor 2, M1 terminal, resistor R, movement contact 3, B1 terminal, and ground within the solenoid 1, within a short time. According to this, the induced current lasts a shorter time than that which flows via the closed circuit of the start motor 2, P and H coils, and the ground inside the solenoid 1 of the prior art; and thus, the rotator or rotor of the start motor 2 is stopped rapidly, and the stopping noise of the rotator is also reduced considerably to an extent that the operator cannot recognize, by properly adjusting the flow time of the induced current through the resistor R, that is, the stopping time of the rotator, without its excessive reduction.

Using the stopping noise reduction circuit of the present invention, the stopping time of the rotator within the start motor 2 can freely be modified by adjusting the value of the resistor R.

Figure 5:
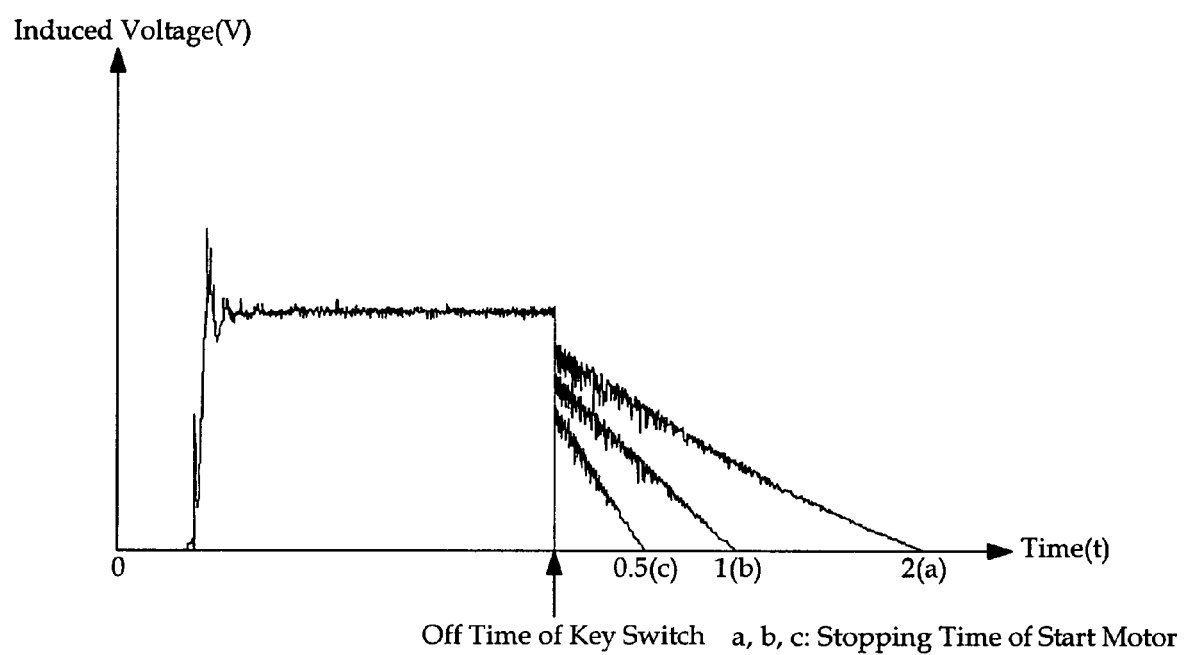
FIG. 5 is a graph showing stopping time data of a start motor in accordance with the present invention.

FIG. 5 is a graph showing stopping time data of the start motor in accordance with the present invention. Referring to a waveform of the induced voltage as shown, it can be seen that the induced voltage decreases as the number of rotations of the rotator inside the start motor 2 decreases. Further, the stopping time taken from the off of the key switch SW to the stop of the start motor 2 appears that the prior art takes 2 sec as indicated in (a) of FIG. 5, while the present invention takes 1 or 0.5 sec as in (b) or (c) of FIG. 5, which is reduced by adjusting the value of the resistor R. As a result, it can be seen that the stopping noise of the rotator inside the start motor that has been occurred upon the stop thereof can also be reduced considerably.

As described above, the present invention can maximally reduce the stopping noise to the extent that the user cannot recognize by freely adjusting the stopping time of the rotator in the start motor by making that the resistor with less value than that of the serial circuit by the P and H coils inside the solenoid is connected to two the terminals separately arranged within the solenoid such that the induced current made by the rotator of the start motor is flowed into the earth by way of the resistor after the two terminals are coupled via the movement contact upon the off of the key switch. Moreover, the present invention can prolong the endurance life span of brush and bearing inside the start motor by making the total rotational time of the start motor shortened by the reduction of the flow time of the induced current via the resistor.

The present application contains subject matter related to Korean patent application No. 2004-0066319, filed with the Korean Intellectual Property Office on Aug. 23, 2004, the entire contents of which is incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A stopping noise reduction circuit for a start motor comprising a battery for providing power to drive the start motor, a key switch for controlling an on/off state of the power supply from the battery, and a solenoid having a permanent magnet, P and H coils, and a movement contact to drive the start motor, the circuit comprising:
   a B1 terminal grounded inside the solenoid;
   an M1 terminal connected to an M terminal of the start motor; and
   a resistor coupled with the B1 or M1 terminal, wherein, upon a turning off of the key switch, the movement contact of the solenoid is connected to the B1 and M1 terminals such that more induced current than an induced current flowing into the P and H coils inside the solenoid, in a current induced by a rotator of the start motor, is conducted to ground via the resistor within a short time, wherein a value of the resistor is less than a resistor value of a serial circuit of the P and H coils inside the solenoid.

2. A stopping noise reduction circuit for a starter motor comprising a battery for providing power to drive the starter motor, a key switch for alternately connecting the battery to and disconnecting the battery from the starter motor, and a solenoid having a permanent magnet, P and H coils, and a movement contact to drive the starter motor, the stopping noise reduction circuit comprising:
   a grounded first terminal inside the solenoid;
   a second terminal connected to a terminal of the starter motor; and
   a resistor coupled with at least one of the first and second terminal, said resistor having a resistance value less than a resistance value of a serial circuit of the P and H coils inside the solenoid,
   wherein, upon a turning off of the key switch, the movement contact of the solenoid is connected to the first and second terminals such that induced current flowing through said resistor to ground is greater than induced current flowing through the P and H coils inside the solenoid.

* * * * *